(12) United States Patent
Pollard et al.

(10) Patent No.: US 10,226,889 B2
(45) Date of Patent: *Mar. 12, 2019

(54) METHOD OF INJECTION MOLDING USING ONE OR MORE EXTERNAL SENSORS AS A VIRTUAL CAVITY SENSOR

(71) Applicant: iMFLUX Inc., Cincinnati, OH (US)

(72) Inventors: Rick Alan Pollard, Moscow, OH (US); Joshua Douglas Raker, Waynesville, OH (US); Gene Michael Altonen, West Chester, OH (US); H. Kenneth Hanson, III, Cincinnati, OH (US)

(73) Assignee: IMFLUX, INC., Hamilton, OH (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/216,762

(22) Filed: Jul. 22, 2016

(65) Prior Publication Data

US 2017/0021544 A1 Jan. 26, 2017

Related U.S. Application Data

(60) Provisional application No. 62/195,354, filed on Jul. 22, 2015.

(51) Int. Cl.
*B29C 45/77* (2006.01)
*B29C 45/00* (2006.01)
(Continued)

(52) U.S. Cl.
CPC .......... *B29C 45/77* (2013.01); *B29C 45/0001* (2013.01); *B29C 45/76* (2013.01);
(Continued)

(58) Field of Classification Search
None
See application file for complete search history.

(56) References Cited

U.S. PATENT DOCUMENTS 5,472,331 A 12/1995 Watkins
5,916,501 A * 6/1999 Hehl .................. B29C 45/76
264/328.1

(Continued)

FOREIGN PATENT DOCUMENTS

EP 0897786 A2 2/1999
JP H08112842 A 5/1996

OTHER PUBLICATIONS

International Search Report and Written Opinion for Application No. PCT/US2016/043591 dated Oct. 10, 2016.
(Continued)

*Primary Examiner* — Nathan T Leong
(74) *Attorney, Agent, or Firm* — Marshall, Gerstein & Borun LLP

(57) ABSTRACT

A injection molding method involves measuring, using at least one external sensor, a change in a parameter of a mold side of a mold cavity, approximating a condition within the mold cavity based on the change in the parameter, such as pressure within the mold cavity or flow front position, and comparing the approximated condition to a trigger point. If the approximated condition equals or exceeds the trigger point, activating a virtual cavity sensor having an optimal pre-defined pressure-time curve, and upon activation, the virtual cavity sensor tracks an approximated condition calculated from the change in parameter measurements measured by the at least one external sensor over time. In an embodiment, results of the approximated parameter tracking can be used in conjunction with an optimal pre-defined pressure-time curve.

17 Claims, 10 Drawing Sheets

(51) Int. Cl.
  *B29C 45/76* (2006.01)
  *B29C 45/78* (2006.01)
  *B29C 45/80* (2006.01)
  *B29K 101/12* (2006.01)
  *B29K 105/00* (2006.01)

(52) U.S. Cl.
  CPC ............ *B29C 45/766* (2013.01); *B29C 45/78* (2013.01); *B29C 45/80* (2013.01); *B29C 2945/761* (2013.01); *B29C 2945/76006* (2013.01); *B29C 2945/76103* (2013.01); *B29C 2945/76254* (2013.01); *B29C 2945/76381* (2013.01); *B29C 2945/76481* (2013.01); *B29C 2945/76498* (2013.01); *B29C 2945/76531* (2013.01); *B29C 2945/76545* (2013.01); *B29C 2945/76568* (2013.01); *B29C 2945/76735* (2013.01); *B29C 2945/76765* (2013.01); *B29C 2945/76859* (2013.01); *B29C 2945/76933* (2013.01); *B29C 2945/76943* (2013.01); *B29C 2945/76946* (2013.01); *B29K 2101/12* (2013.01); *B29K 2105/0067* (2013.01)

(56) References Cited

U.S. PATENT DOCUMENTS

| | | | |
|---|---|---|---|
| 6,056,902 A * | 5/2000 | Hettinga | ................ B29C 45/00 264/328.12 |
| 7,676,300 B2 | 3/2010 | Kim et al. | |
| 8,092,206 B2 | 1/2012 | Brunbauer et al. | |
| 2011/0175248 A1 | 7/2011 | Akasaka | |
| 2015/0115491 A1* | 4/2015 | Altonen | ............. B29C 45/7646 264/40.7 |

OTHER PUBLICATIONS

International Preliminary Report on Patentability for Application No. PCT/US2016/043591, dated Jan. 23, 2018.
In-Situ Shrinkage Sensor for Injection Molding by Rahul R. Panchal and David O. Kazmer, Journal of Manufacturing Science and Engineering, Dec. 2010, vol. 132, 064503-1-064503-6.

* cited by examiner

METHOD OF INJECTION MOLDING USING ONE OR MORE EXTERNAL SENSORS AS A VIRTUAL CAVITY SENSOR

FIELD OF THE INVENTION

This application relates generally to injection molding and, more specifically, to methods for using an external sensor on the exterior of a mold surface adjacent to a parting line of the mold to approximate conditions, such as pressure or melt flow front position, within an injection mold and, optionally, if an approximated condition hits or exceeds a trigger point, perform additional calculations and/or adjust the injection molding process, thereby using the external sensor along with a virtual cavity sensor as part of a pressure controlling system.

BACKGROUND OF THE INVENTION

During injection molding, molten thermoplastic material flows into a mold cavity of a mold via one or more gates. The pressure within the mold cavity is an important vector, as insufficient pressure may result in improperly formed parts while excessive pressure may result in damage to the mold. The pressure at the melt flow front provides information relevant to the injection molding process overall by, for example, enabling calculation of how fast a mold cavity is filling and how long cooling of the molded part within the cavity is likely to take. Some injection molding processes aim to have the melt flow front follow a particular pressure pattern over time in order to optimize the injection molding process. For example, some injection molding processes maintain a pressure balance between the air pressure in the cavity, which changes based on the mold cavity geometry as the molten thermoplastic material moves into the cavity of the mold, and the pressure at the melt flow front, in order to produce a final product that is fully relieved of internal stresses that would otherwise undesirably lead to shrink, sink and warpage. For such injection molding systems, determining the real-time pressure at the melt flow front is important in order to determine whether the desired pressure/time curve is properly being followed and, if deviations from the pressure/time curve are identified, to make adjustments to correct the pressure of the melt flow front.

Ideally, sensors for measuring the pressure within a mold cavity and at a melt flow front would be indirect, easy to install, and inexpensive. Direct sensors, such as sensors placed within a mold cavity, leave undesirable marks on part surfaces. For example, while demand for injection molded parts with high gloss finishes has been increasing, direct sensors positioned in the mold cavity have a tendency to mar the high gloss finish of the parts. As a result, indirect sensors that are not located in the mold cavity are preferable. Some current indirect sensors include parting line sensors, ejector or static pin sensors, and ultrasonic sensors. Unfortunately, these indirect sensors cannot always be placed in optimal locations, sometimes require that a mold apparatus undergo a period of downtime in order to be machined so that the sensor can be mounted, and can be expensive. The same problems plague the current use of strain gauge sensors for indirectly measuring pressure within a mold cavity. For example, strain gauge sensors have been used in conjunction with molding apparatuses having ejector sleeves or long core pins, but not all injection molding apparatuses are configured to include an ejector sleeve or long core pin.

SUMMARY OF THE INVENTION

Embodiments within the scope of the present invention are directed to the use of external sensors to approximate conditions, such as pressure within a mold cavity or the location of a melt flow front, during an injection molding process. Strain gauge sensors are the type of external sensor primarily discussed, while other external sensors capable of detecting movement of mold halves could achieve the same purpose and are within the scope of the present disclosure. For example, microwave sensors, x-ray sensors, ultrasonic sensors, air pressure sensors, air temperature sensors, subsurface temperature sensors could all be substituted for the strain gauge sensors described and depicted below. Additionally, other types of external gauge sensors, such as electrical, electronic, mechanical, wireless, and fiber optic sensors, could be utilized instead of strain gauge sensors.

Embodiments within the scope of the present invention are directed to the use of strain gauge sensors to approximate conditions, such as pressure within a mold cavity or the location of a melt flow front, during an injection molding process. In many molds, a direct correlation exists between internal mold cavity pressures and change in strain measured by one or more strain gauges on an external portion of a mold. In such molds, an external strain gauge may be used in place of a direct sensor to monitor and adjust internal mold cavity pressure. In the remainder of molds, a direct correlation does not exist between internal mold cavity pressures and change in strain measured by one or more strain gauges on an external portion of a mold. However, a direct correlation still exists between the location of the melt flow front within the mold cavity and the change in strain measured by one or more strain gauges on an external portion of a mold. The strain gauge sensor or sensors, along with a virtual cavity sensor, are used as part of a pressure controlling system to sense a parameter within the mold cavity, such as the pressure within the mold cavity or the location of the melt flow front, and adjust the injection molding process if the parameter hits or exceeds a trigger point or range. In embodiments within the scope of the present invention, at least one strain gauge sensor is mounted on an exterior of a mold, such as on the exterior of a mold plate of a stacked mold, adjacent to a parting line located between two mold sides defining one or more mold cavities of an injection molding system. In some embodiments of the present invention, two strain gauge sensors are used, one adjacent to a parting line of the mold and near the nozzle to the mold cavity and the other adjacent to a parting line of the mold and at a location that is downstream of the nozzle when molten thermoplastic material is injected into the mold cavity.

The strain gauge sensors work by measuring surface strain on a mold surface that occurs over the course of a standard injection molding process. In a typical injection molding apparatus, a mold cavity is formed between two mold sides, which are held together under pressure by a press or clamping unit. Thus, along the parting line of the mold, a closing force is exerted by the press or clamping unit. When molten thermoplastic material is injected into the mold cavity, the molten thermoplastic material exerts an opening force along the parting line of the mold. Ideally, the opening force exerted by the molten thermoplastic material is less than the closing force exerted by the clamping unit. If the opening force is greater than the closing force, the mold sides are forced apart and flashing, or leakage of the molten thermoplastic material, occurs. A strain gauge sensor placed on the exterior of the mold surface adjacent to a parting line of a mold is able to sense the surface strain changes on the mold surface that occur over time as a result of the closing and opening forces.

In response to surface strain changes, the strain gauge sensor emits an electrical signal, typically in the range of −10 to 10 Volts. The signal emitted by the strain gauge sensor is received and used by a controller to approximate one or more conditions within the mold, such as the pressure within the mold cavity or the location of the melt flow front. In certain molds in which the ratio of the length of the flow channel to the thickness of the molded part is great, i.e. molds having a high L/t ratio, the pressure at the melt flow front may be approximated based on the signals emitted by the strain gauge sensor(s). These approximations may be useful for adjusting the injection molding process. For example, the amount of pressure within the mold cavity may be approximated and compared to a maximum permissible mold cavity pressure in an effort to ensure that the mold cavity is not damaged by excessive mold cavity pressure.

In some embodiments within the scope of the present invention, if a condition calculated by the controller hits or exceeds a trigger point, a pressure controlling system of which the strain gauge sensor is a part may modify operation of an injection molding system in an effort to bring or return the sensed or another parameter, to a level within an ideal range. In addition to one or more strain gauge sensors, the pressure controlling system of the present disclosure includes a virtual cavity sensor, which can be implemented as a set of instructions (e.g., a software program) stored on a non-transitory machine-readable medium and executed by one or more general-purpose or special-purpose processors. The virtual cavity sensor can read data from, and in some cases write data to, a machine-readable memory storing data representative of an optimal pre-defined pressure-time curve corresponding to the part being manufactured by the injection molding process and the material forming the part. The pre-defined pressure-time curve is defined by an equation or relationship in which time is the independent variable and pressure is the dependent variable. In some embodiments, the pre-defined pressure-time curve is a parabolic curve that approaches an asymptote at the maximum pressure setting the mold cavity is set to achieve. In some embodiments in which the controller approximates an internal mold pressure based on a change in strain, the virtual sensor compares the real-time pressure approximated from the strain gauge reading over time to the optimal pre-defined pressure-time curve to determine whether the injection molding process is operating as expected. In conjunction with other information available from the injection molding apparatus, such as how far the screw that injects the molten thermoplastic material into the mold cavity has traveled, the virtual sensor can determine the viscosity of the molten thermoplastic material and the percentage of the mold cavity that has been filled. In the event that the real-time data approximated from the strain gauge sensor reading indicates that the optimal pre-defined pressure-time curve is not being followed, the virtual sensor system can direct the injection molding apparatus to take corrective action, such as by altering the rate and/or force of advancement of the screw that injects additional molten thermoplastic material in order to increase the pressure at the melt flow front or within the mold cavity.

The term "flow front" refers to a leading edge of a shot of molten polymeric material, as experienced by the surfaces of the mold that define a mold cavity, as the molten polymeric material is progressing from a nozzle or gate of the mold cavity (i.e., a point or points of introduction of the molten polymeric material to the mold cavity) toward, and ultimately to, an end-of-fill location of the mold cavity.

In some embodiments in which the controller determines the location of the melt flow front based on a change in strain, upon realization of strain sensor data indicative of the melt flow front reaching a certain position within a mold cavity, the virtual sensor system can direct the injection molding apparatus to take actions guided by a pre-defined pressure-time curve, such as increasing or adjusting the rate and/or force of advancement of the screw to ensure the mold is properly filled, or even actuating some portion of a mold.

An example of actuation of a portion of a mold that might be performed upon the melt flow front reaching a predetermined location within a mold cavity is sequential coining, which is discussed at length in U.S. Patent Appl. No. 62/186,722, filed on Jun. 30, 2015 and entitled "Sequential Coining", which is hereby incorporated by reference.

The term "flow filling challenge" is defined as a region of a part of a mold that forms a feature of a part to be molded which is particularly susceptible to any one or more of a number of problems that complicate the molding of the part or render the molded part more likely to suffer from one or more defects or reduced mechanical properties, such as short-fills, warp, sinks, brittleness, flash, voids, non-fills, weakness (e.g., low tensile, torsional, and/or hoop strength), high stress concentrations, low modulus, reduced resistance to chemical exposure, premature fatigue, non-uniform shrinkage, and discontinuities in color, surface texture, opacity, translucency, or transparency. Non-exhaustive examples of flow filling challenges are: Locations in a mold used to form ribs, bosses, or corners, as well as obstacles in a mold (such as core pins), and transitions (such as a change in thickness of a part to be molded, which may be a sudden stepped change in thickness or a gradual change in thickness, such as a tapered region). These can involve a transition from a relatively thick region to a relatively thin region, and then back to a relatively thick region, and may involve one or more changes in thickness. A transition of particular interest for purposes of the present disclosure is a living hinge, which is typically an integral, relatively thin region of a molded part that permits one portion of the part, such as a flip-top of a cap, to rotate with respect to the rest of the part. As the term flow filling challenge is used herein, it is contemplated that the region of the part affected by a particular challenge may be at a particular position, along a region, or downstream of a particular position or region, and as such, a flow filling challenge need not be limited to a particular location of a change in shape of a mold, but may extend beyond, i.e. downstream of, such a location.

Determining the location of the melt flow front using data from one or more external sensors such as a strain gauge sensor can also be useful to determine the relative location of the melt flow front to a flow filling challenge within the mold cavity. An indication of the melt flow front having reached a predetermined location relative to a flow filling challenge can serve as a signal to initiate, or discontinue, heating of a portion of a mold cavity, such as inductively heating a region of a mold cavity in proximity of a flow filling challenge for a limited duration of time while the melt flow front is passing across or along that flow filling challenge, as described in U.S. Patent Application No. 62/045,373, filed on Sep. 3, 2014, an entitled "Injection Molding with Localized Heating in Flow Challenge Regions," which is hereby incorporated by reference.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
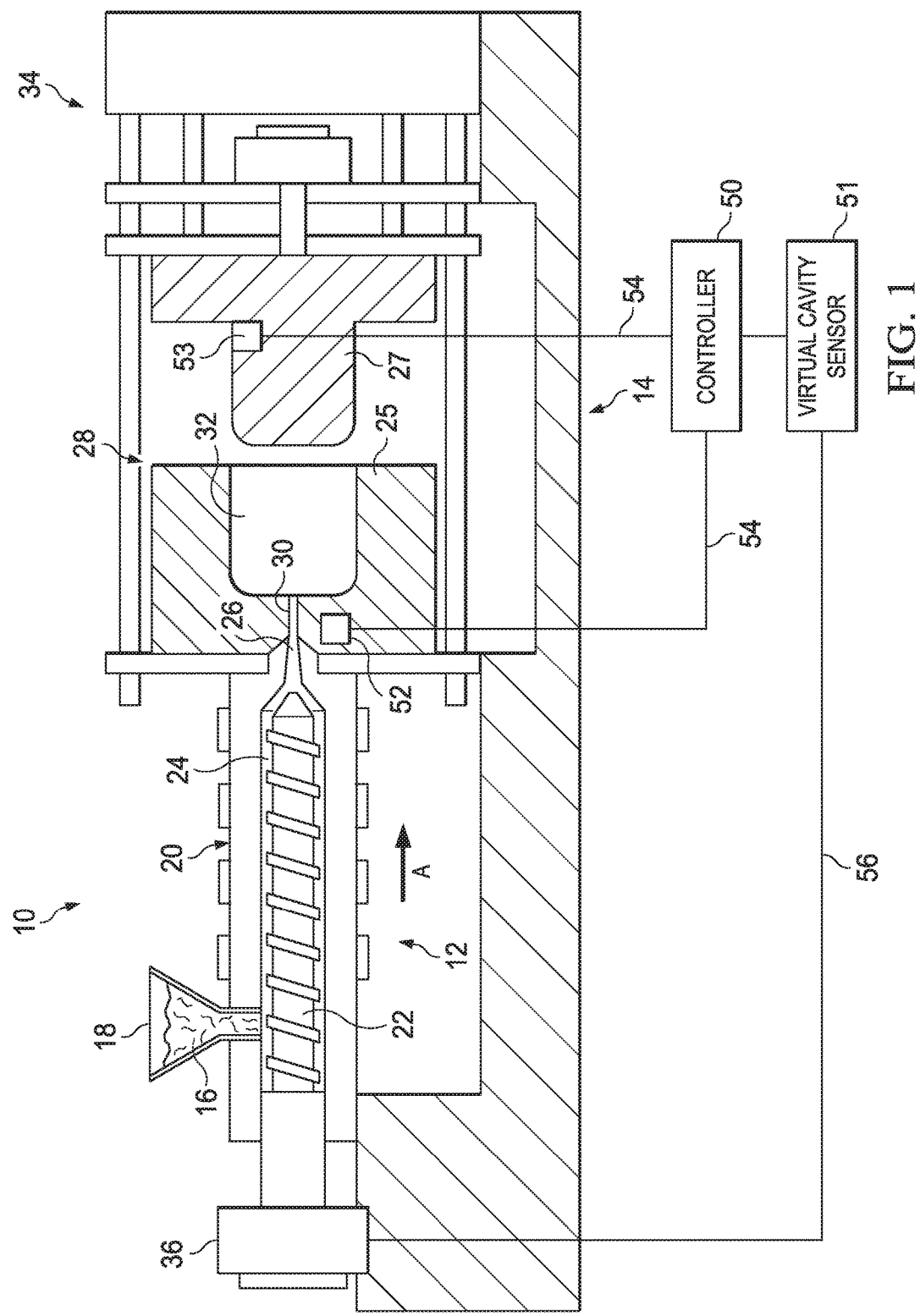
FIG. 1 illustrates, semi-schematically, an injection molding apparatus constructed according to the present disclosure, wherein two strain gauge sensors are located on the exterior surfaces of mold sides adjacent to a parting line between the mold sides, the first strain sensor gauge being on the first mold side in the vicinity of the nozzle to the mold cavity, and the second strain sensor gauge is on the second mold side downstream of the nozzle.

Referring to the figures in detail, FIG. 1 illustrates an exemplary injection molding apparatus 10 for producing thermoplastic parts in high volumes (e.g., a class 101 injection mold, or an "ultra-high productivity mold", a class 102 (medium-to-high productivity mold), or class 103 (a medium productivity mold)). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a first strain gauge sensor 52 and a screw control 36. The first strain gauge 52 is located on the exterior surface of first mold side 25 near the parting line between the first mold side 25 and the second mold side 27 and in the vicinity of the nozzle 26. The controller 50 may include a microprocessor (or another suitable processing unit, or several such units), a non-transitory memory, and one or more communication links. The controller 50 may also be optionally connected to a second strain gauge sensor 53 located on the exterior surface of the second mold side 27 near the parting line between the first mold side 25 and the second mold side 27 and downstream of the nozzle 26. Although two strain gauge sensors are utilized in the embodiment depicted in FIG. 1, other embodiments within the scope of the present invention may employ only one strain gauge sensor or may use more than two strain gauge sensors. Moreover, embodiments within the scope of the present disclosure may use strain gauge sensors located at other locations on a mold side.

Figure 2:
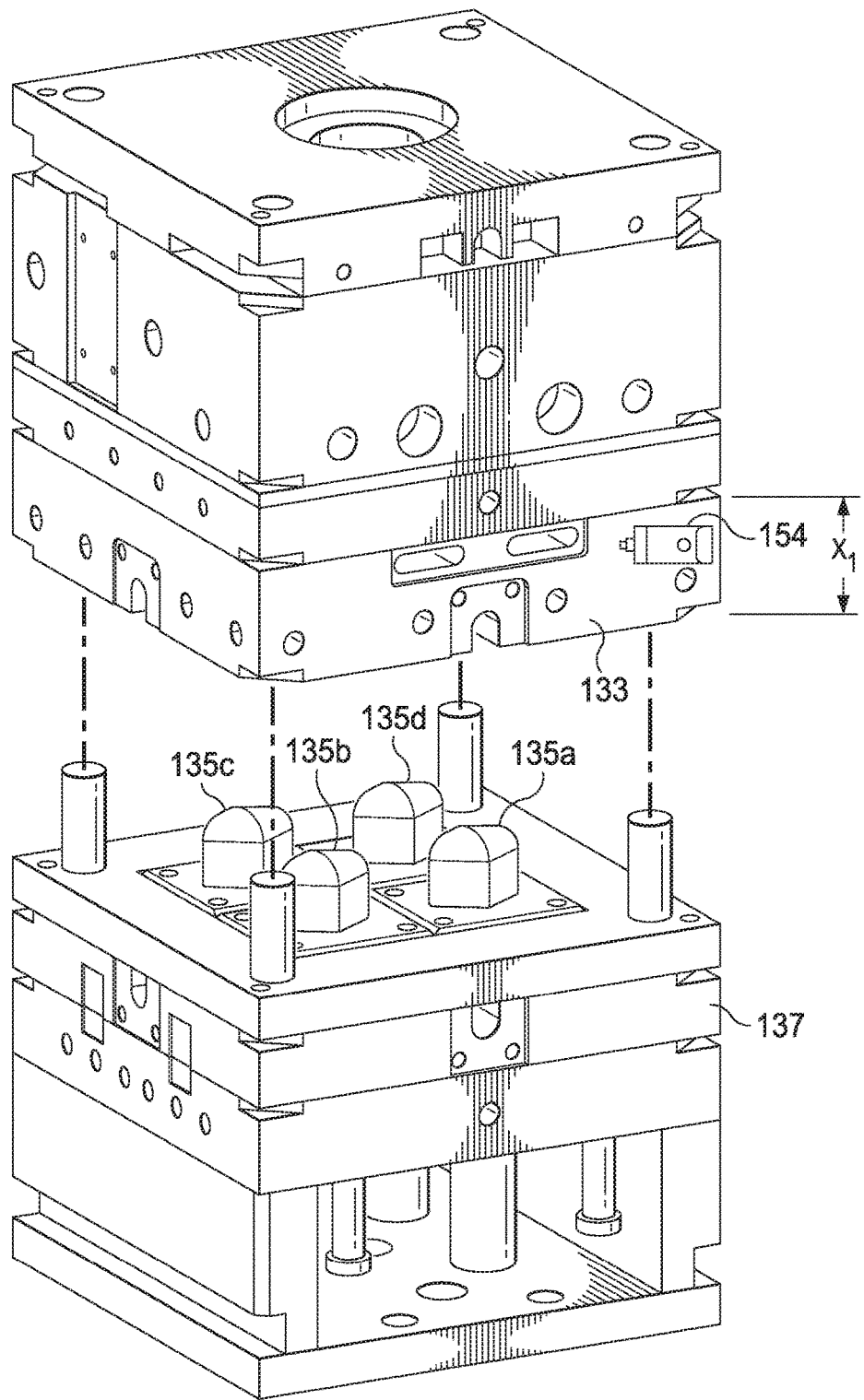
FIG. 2 illustrates a stacked mold for a multi-cavity injection molding system, including a pair of plates defining two mold sides, at least one of the plates having a strain gauge sensor located on an exterior surface thereof adjacent to the parting line between the mold sides, shown at a time prior to any forces being exerted on the mold cavity.
Figure 3:
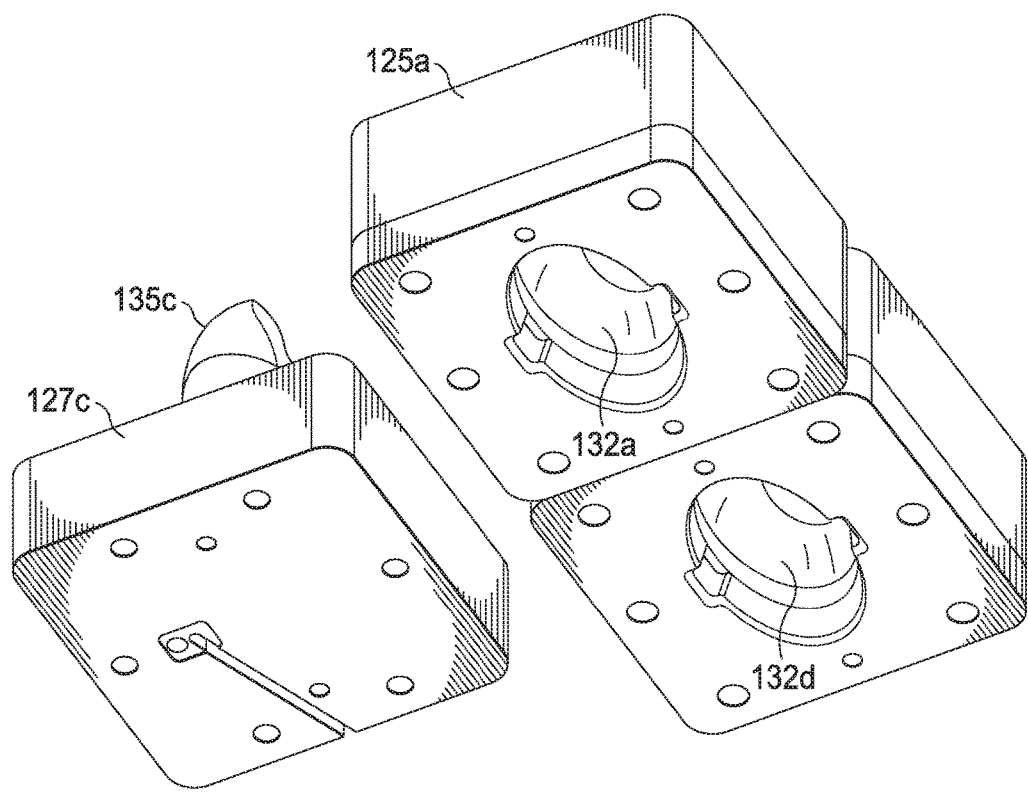
FIG. 3 illustrates the stacked mold for a multi-cavity injection molding system illustrated in FIG. 2, when a closing force is being exerted by a clamping unit (not shown) just prior to, or at the initiation of, injection of molten thermoplastic material into the mold cavities.
Figure 4:
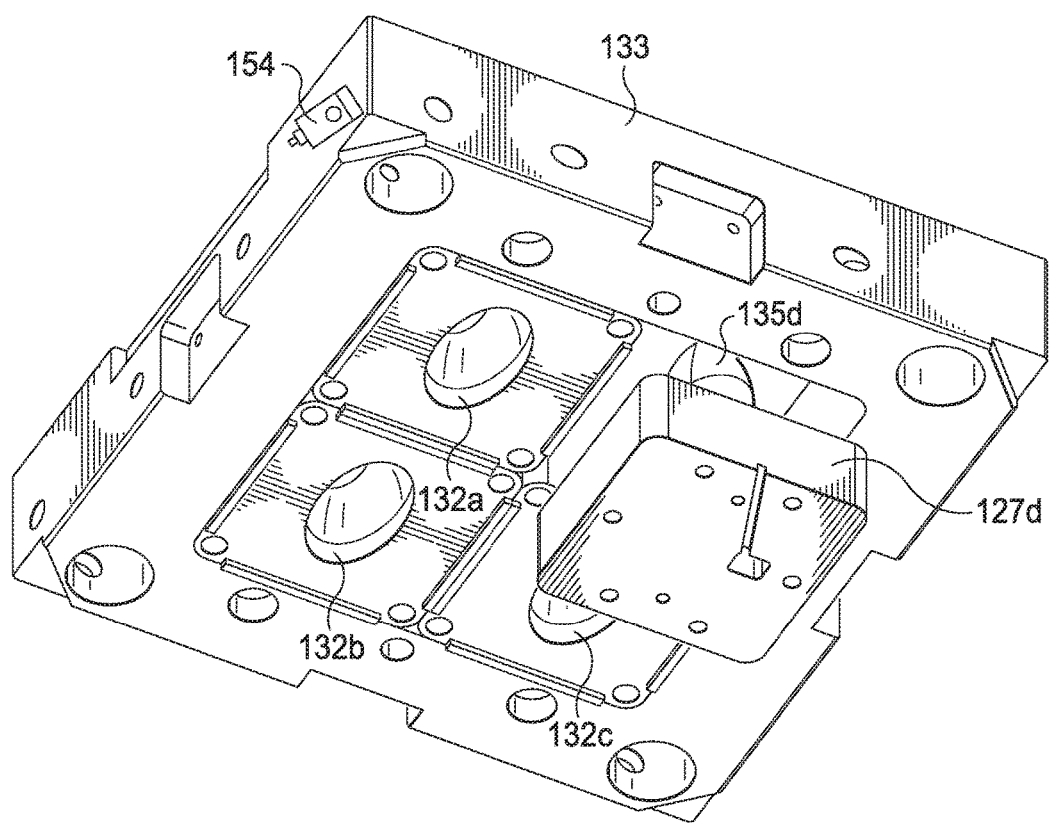
FIG. 4 illustrates the mold cavities, mold cores, and first and second mold sides present in the stacked mold for a multi-cavity injection molding system illustrated in FIG. 3.

The strain gauge sensors 52 and 53 sense surface strain of the mold, as discussed in greater depth with respect to FIGS. 2-4. Data from the strain gauge sensors 52 and 53 may be communicated to a processor that calculates the change in the surface strain of the mold. Electric signals 54 from the strain gauge sensors 52, 53 may travel along one or more electrical paths, such as wires 54, depicted in FIG. 1 in solid lines, ranging in strength from 0 to 10 Volts. The controller 50 may be connected to the screw control 36 via wired connection 56. In other embodiments, the controller 50 may be connected to the screw control 36 via a wireless connection, a mechanical connection, a hydraulic connection, a pneumatic connection, or any other type of communication connection known to those having ordinary skill in the art that will allow the controller 50 to communicate with the screw control 36.

The controller 50 may use the change in surface strain calculated from the information provided by the first and second strain gauge sensors 52 and 53 to approximate conditions, such as pressure or melt flow front position, within the mold cavity or, in certain molds, particularly in which the ratio of the length of the flow channel to the thickness of the molded part is large, at the melt flow front of the molten thermoplastic material 24. These approximations may then be used to adjust the injection molding process. For example, the amount of pressure within the mold cavity 32 may be approximated and compared to a maximum permissible mold cavity pressure in order to ensure that the mold cavity 32 is not damaged by excessive mold cavity pressure. If the amount of pressure within the mold cavity 32 is approximated to be dangerously close to the maximum permissible mold cavity pressure, or even in excess of a safety threshold well below the maximum permissible mold cavity pressure, the controller 50 may direct the screw control 36 to cease-injecting molten thermoplastic material. Other approximations may be used to control the molding process, such that variations in material viscosity, mold temperatures, melt temperatures, and other variations influencing filling rate, can be used to trigger adjustments to the injection molding system by the controller 50. These adjustments may be made immediately during the molding cycle, or corrections can be made in subsequent cycles. Furthermore, the approximations may be averaged over a number of cycles and then used to make adjustments to the molding process by the controller 50.

Additionally, the controller 50 is in communication with a virtual cavity sensor 51, which is implemented as a program, or a set of software instructions. More generally, however, a virtual cavity sensor can be implemented in hardware (e.g., as an application-specific integrated circuit (ASIC)), firmware, software, or any suitable combination thereof. In this disclosure, the term "virtual cavity sensor" can refer to a module that determines the value of a process variable, such as pressure, without directly measuring this process variable. The strain gauge sensors 52 and 53 and the virtual cavity sensor 51 together form a pressure controlling system that generates data relevant to strategic controlling of the pressure within the mold cavity 32. As used herein, the term "pressure controlling system" refers to any suitable group of components, which can include both software-implemented and hardware-implemented components, that generate a signal indicative of a condition within a mold cavity based on a signal indicative of another process variable.

For example, if based on the surface strain information provided by the first and second strain gauge sensors 52 and 53, a processor associated with the controller 50 determines that pressure within the mold cavity exceeds a trigger point (or is outside of a predetermined acceptable range), the virtual cavity sensor 51 signals the controller to adjust the screw control 36 to bring the pressure within the mold cavity back to a level below the trigger point (or within the predetermined acceptable range). As another example, if based on the surface strain information provided by the first and second strain gauge sensors 52 and 53, a processor associated with the controller 50 determines that the melt flow front has progressed beyond a trigger point (which may correlate to a percentage of the mold that has been filled), the virtual cavity sensor 51 signals the controller to adjust the screw control 36 to bring the pressure within the mold cavity to a predetermined acceptable finalizing pressure or range, which may involve a reduction in pressure to avoid over-packing a mold cavity, and thereby prevent unwanted flashing.

FIGS. 2-7 illustrate a stacked multi-cavity injection molding system utilizing a strain gauge sensor 154. As shown in FIG. 3, the stacked multi-cavity injection molding system has mold cavities 132 in first mold sides 125 and complementary mold cores 135 in second mold sides 127. The stacked multi-cavity injection molding system depicted in FIGS. 2-7 has a total of four mold cavities 132 (132a, 132b, 132c, 132d) in four first mold sides 125 (125a, 125b, 125c, 125d) and four mold cores 135 (135a, 135b, 135c, 135d) in four second mold sides 127 (127a, 127b, 127c, 127d), although one or more of the mold cavities 132 in first mold sides 125 or mold cores 135 in second mold sides 127 are omitted from FIGS. 3-5 to allow other elements to be visible in the drawing. Stacked multi-cavity injection molding systems within the scope of the present invention may have more than four or less than four mold cavities 132 in first mold sides 125 and mold cores 135 in second mold sides 127.

Figure 5:
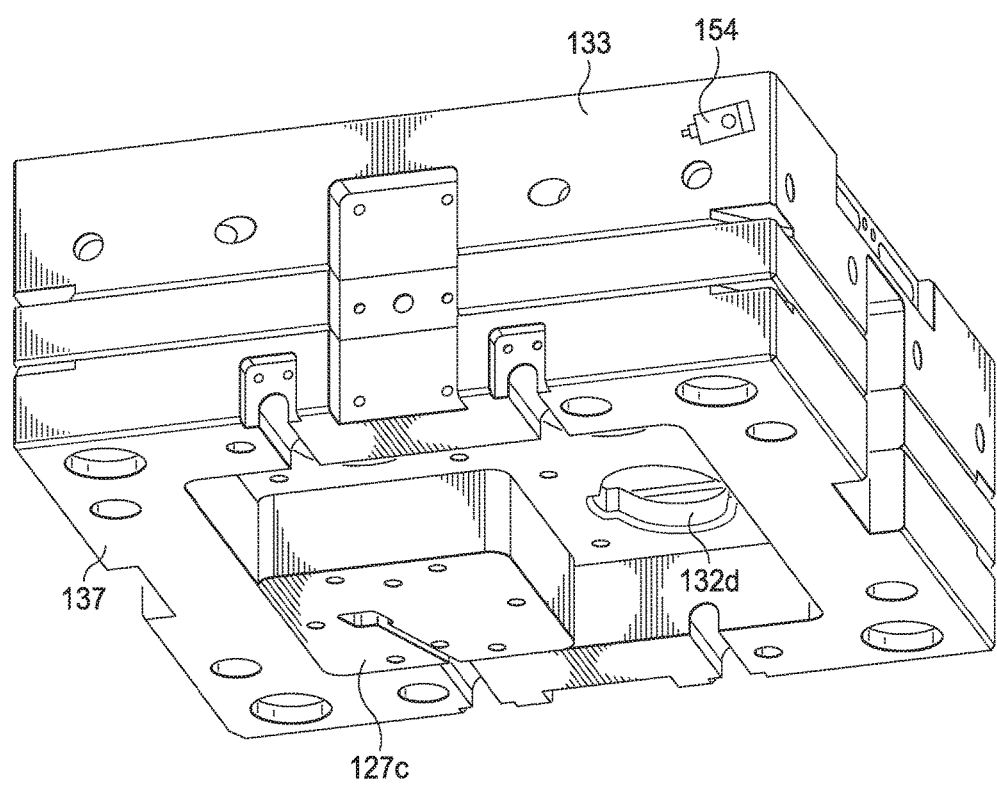
FIG. 5 illustrates the plate surrounding the mold cavities and first mold sides in the stacked mold for a multi-cavity injection molding system illustrated in FIGS. 3-5.

As shown in FIG. 4, the mold cavities 132a, 132b, 132c, and 132d are surrounded by plate 133. As shown in FIG. 5, the mold cores 135 in second mold sides 127 are surrounded by plate 137. In the embodiments depicted in FIGS. 2-7, a strain gauge sensor 154 is located on the exterior of plate 133 adjacent to the parting line of the mold between plate 133 and plate 137. In other embodiments within the scope of the invention, more than one strain gauge sensor 154 may be used, and one or more strain gauge sensor may be placed on plate 133, plate 137, on any of first mold sides 125, or on any of second mold sides 127. In FIGS. 2-7, the strain gauge sensor 154 is located near a corner of plate 133. However, in some embodiments, the strain gauge sensor 154 may be placed near the middle of plate 133, which experiences a greater change in strain as a result of the forces acting on the mold cavities 132 than the corners of the plate that may be supported by guide pins or leader pins. In some embodiments, a determination of whether to place strain gauge sensor 154 or plate 133 or 137 is made on the basis of which plate experiences more strain, which is influenced by which plate is made of a less stiff material, is thinner, or has more cuts through it that reduce its stiffness. In some embodiments, the plate 137 experiences more strain and is therefore a prime location for a strain gauge sensor 154. Interfering components or features, such as connectors for cooling channels, may influence the location of strain gauge sensor 154 in some embodiments. In some embodiments in which a mold has more than one parting line, the strain gauge sensor 154 may be placed closest to the parting line that more directly experiences the opening force caused by the injection of molten thermoplastic material, which in some embodiments is the parting line from which molded parts are ejected. If possible, the strain gauge sensor is placed at a location where a direct correlation exists between internal mold cavity pressures and change in strain readings by the strain gauge. Such a location is most likely to exist in simple molds. If such a location does not exist, as is more likely to be the case in complicated molds where loads are transferred to multiple parts, the strain gauge sensor is placed at a location where a direct correlation exists between the position of the melt flow front and change in strain readings by the strain gauge. Trial and error can be used to determine the optimal location for the strain gauges. Each mold will have a unique or nearly-unique signature that can be mapped by plotting measurements taken by the strain gauges as the mold cavity is filled. Various landmarks on the map, such as peaks, nadirs, valleys, local minimums, or local maximums can be indicative of, for example, melt flow front location. The strain gauge sensors described in the present application, including strain gauge sensors 52, 53, and 54 depicted in FIGS. 1-4, could be chosen from a variety of commercially available strain gauge sensors. For example, the Kistler "Surface Strain Sensor" Type 9232A or Rocktest Telemac's "Surface Mount Strain Gauges" Models SM-5A or SM-5B would work in embodiments within the scope of the present invention. Such strain gauge sensors are designed for quick and easy installation, as they may have anchor blocks that can be welded to the injection molding apparatus or may be screwed into the surface of the injection molding apparatus.

FIG. 2 illustrates a stacked multi-cavity injection molding system at a time prior to any forces being exerted on the mold cavities 132, as the injection molding system is in an open condition. With no external forces acting on it, the plate 133 has a baseline thickness $X_1$. Likewise, the plate 133 has a baseline strain, which may be zero, inherent in its construction. The strain gauge sensor 154 detects a strain, for example $\mu\varepsilon_1$, based on the sensed baseline strain of the plate 133.

Figure 6A:
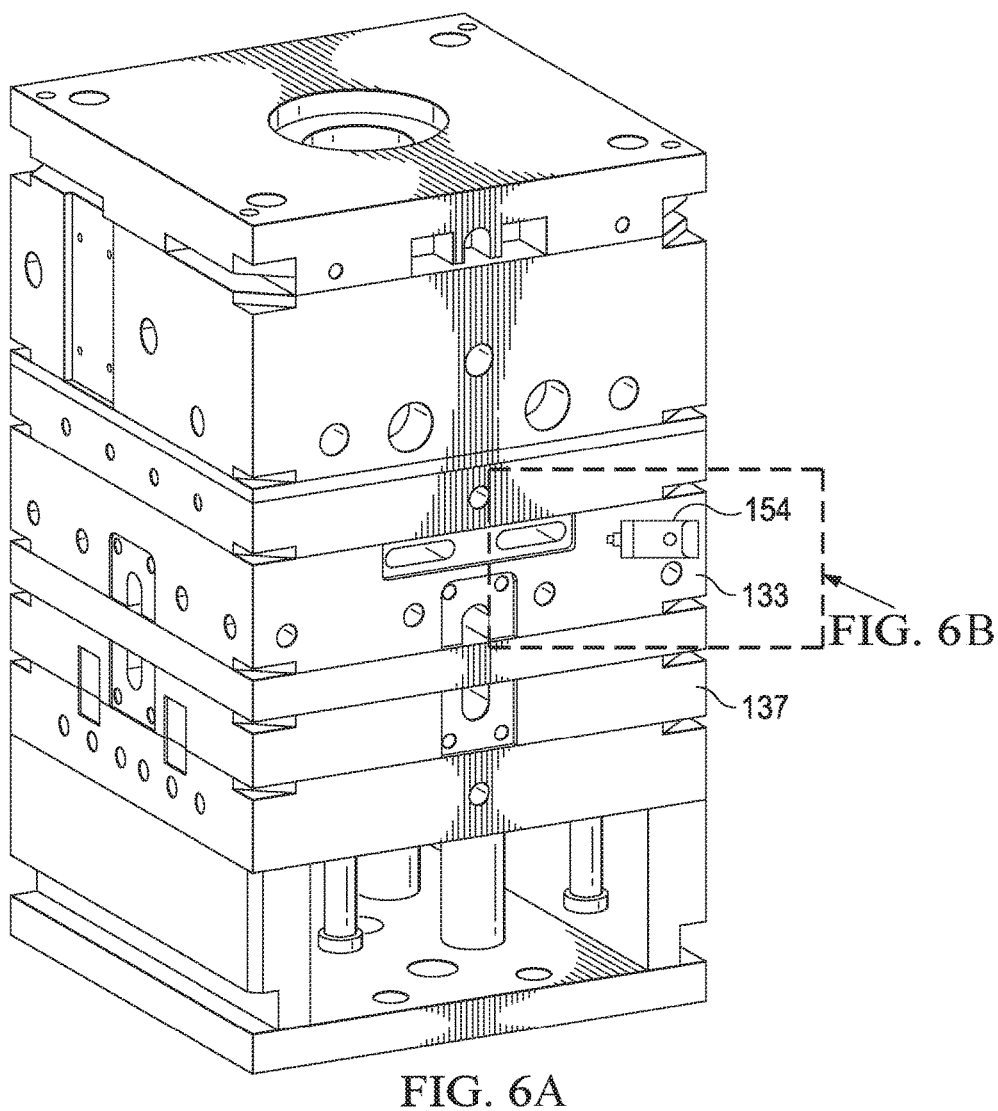
FIG. 6A-B illustrates both the plate surrounding the mold cavities and the plate surrounding the mold cores in the stacked mold for a multi-cavity injection molding system illustrated in FIGS. 3-5.
Figure 6B:
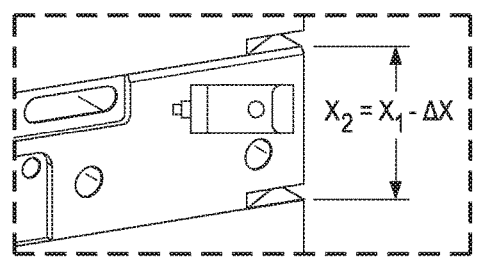

FIG. 6A illustrates the mold cavities 132 under the closing force exerted by a press or clamping unit (not depicted). Under the closing force, the plate 133 changes shape slightly. For example, the thickness of the plate 133, which was previously $X_1$, is changed by an amount $\Delta X$ to have a new thickness $X_2$. Likewise, the strain in the plate 133 changes. The strain gauge sensor 54 detects a strain, for example $\mu\varepsilon_2$, that corresponds with this change. In general, the closing force results in a compressive strain. However, this may not always be the case depending on the particular injection molding apparatus in use and the location of the strain gauge sensor 154. As a result, the change in strain detected by the strain gauge sensor 154 over time may be either positive or negative, or the system of the present invention may operate based on an absolute value of change in strain over time. FIG. 6B is an enlarged view of the portion of FIG. 6A having the strain gauge sensor.

Figure 7A:
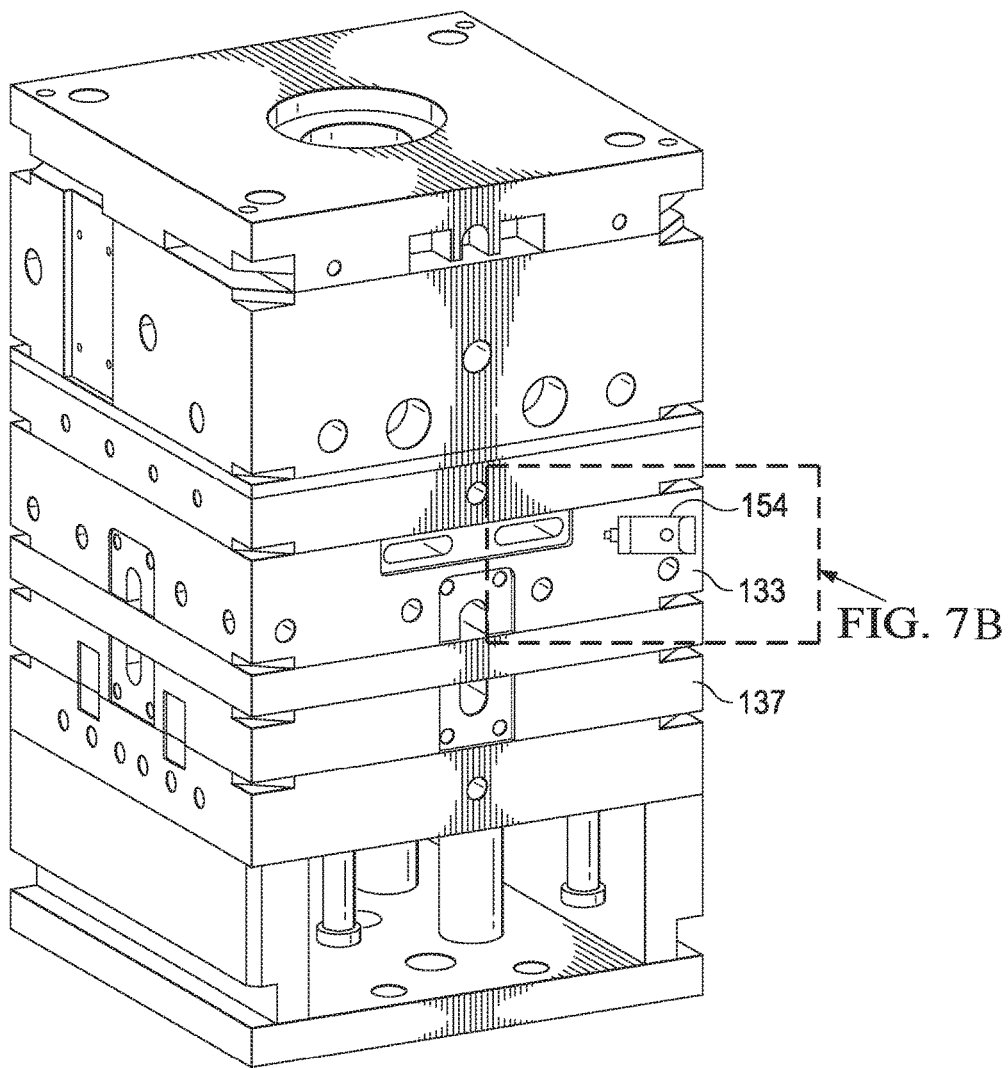
FIG. 7A-B illustrates the stacked mold for a multi-cavity injection molding system illustrated in FIGS. 3-6, when both a closing force is being exerted by a clamping unit (not shown) and an opening force is being exerted by molten thermoplastic material as it is injected in the mold cavity.
Figure 7B:
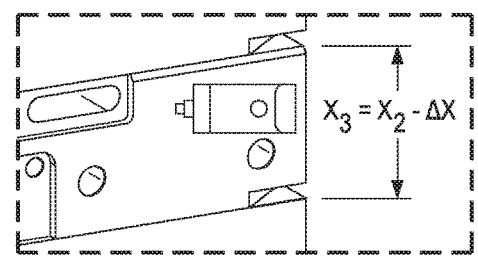

FIG. 7A illustrates the mold cavities 132 under both the closing force exerted by a press or clamping unit (not depicted) and an opening force exerted by thermoplastic molten material as it is injected into the mold cavities 132. Plate 133 responds to the combination of the forces. For example, the thickness of plate 133, which was $X_1$ when no forces were applied to the mold cavities 32 and $X_2$ when only a closing force was applied to the mold cavities 132, is changed by an amount $\Delta X$ to have a new thickness $X_3$. The displacement caused by the addition of the opening force to the closing force also results in a change in the surface strain, and the strain gauge sensor 154 detects a strain, for example $\mu\varepsilon_3$, that corresponds with this change. In general, the opening force results in a relaxing tensile strain. However, this may not always be the case depending on the particular injection molding apparatus in use and the location of the strain gauge sensor 154. As a result, the change in strain detected by the strain gauge sensor 154 may be either positive or negative. Depending on where the strain gauge sensor 154 is located, the strain gauge sensor 154 may detect a change in tensile strain or a change in compressive strain. The trigger point that activates a virtual cavity sensor, such as virtual cavity sensor 51 depicted in FIG. 1, will generally occur when the mold cavities 132 are experiencing both an opening force and a closing force as depicted in FIG. 7A as this is the period of time during the injection molding process when molten thermoplastic material is actually being injected into the mold cavities 132 to form a part. FIG. 7B is an enlarged view of the portion of FIG. 7A having the strain gauge sensor.

Figure 8:
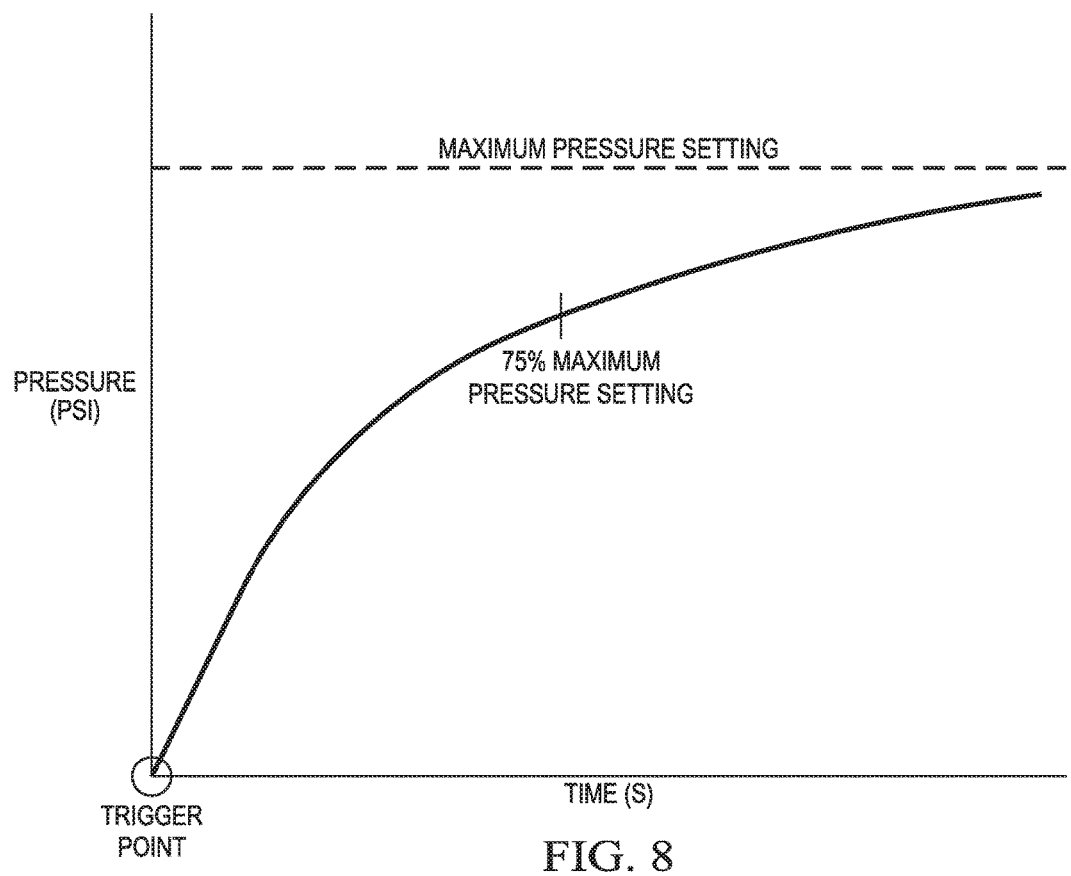
FIG. 8 illustrates graphically a plot of a parabolic pre-defined pressure-time curve that may be utilized by a virtual sensor system of the present disclosure as a desired pressure-time curve to which an injection molding system may be controlled to achieve based on feedback from the strain gauge(s)

FIG. 8 depicts an optimal pre-defined pressure-time curve that can be used by a virtual cavity sensor 51. The independent (horizontal) axis represents time, and the dependent (vertical) axis represents pressure. The origin is a trigger point, which may occur at or near a time when molten thermoplastic material begins to enter a mold cavity 32, 132, or 232 and exert an opening force detectable by a strain gauge sensor. In some embodiments, the optimal pre-defined pressure-time curve is parabolic with an asymptote located a maximum pressure setting that occurs when a part is fully formed. In some embodiments, the pressure-time curve is defined by two variables: 1) the time for a mold cavity to fill to 75%, and 2) the maximum pressure setting. In some embodiments, the virtual cavity sensor 51 compares the real-time pressure approximated from readings by strain gauge sensors over time to the optimal pre-defined pressure-time curve to determine whether the injection molding process is operating as expected. In conjunction with other information available from the injection molding apparatus 10 or 210, such has how far the reciprocating screw 22 has traveled as measured by a mechanism connected to the screw 22, the virtual cavity sensor 51 can determine the viscosity of the molten thermoplastic material 24 or 224 and the percentage of the mold cavity 32, 132, or 232 that has been filled. In the event that the real-time data approximated from the readings from strain gauge sensors 52, 53, 154, or 256 indicates that the optimal pre-defined pressure-time curve is not being followed, the virtual cavity sensor 51 can direct the injection molding apparatus 10 or 210 to take corrective action, such as by injecting additional molten thermoplastic material 24 or 224 in order to increase the pressure at the melt flow front or within the mold cavity 32, 132, or 232. An example method of taking such corrective action is discussed below with reference to FIG. 10. In other embodiments, the virtual cavity sensor 51 determines whether the position of the melt flow front has reached or passed a trigger position within the mold cavity 32, 132, or 232, which may correlate with the mold cavity 32, 132, or 232 being a certain percentage full, and can direct the injection molding apparatus 10 or 210 to take an action guided by the optimal pre-defined pressure time curve, such as increasing (or decreasing) the rate at which additional molten thermoplastic material 24 or 224 is injected in order to increase (or decrease) the pressure at the melt flow front or within the mold cavity 32, 132, or 232, activating one or more localized heating elements to heat one or more regions of the mold cavity 32, 132, 232, or actuating a portion of a mold cavity (e.g., to achieve coining). In the examples discussed above, in addition to determining approximate pressure, the virtual cavity sensor 51 causes the injection molding apparatus 10 or 210 to take corrective action. In another embodiment, the virtual cavity sensor 51 only generates a signal indicative of the pressure inside the mold cavity, and another component determines whether to direct the injection molding apparatus 10 or 210 to take corrective action in view of the output of the virtual cavity sensor 51 and possibly other signals or pre-set values. This component can be implemented as part of the controller 50 of FIG. 1, for example. More generally, functionality related to approximating pressure using strain gauge sensor readings, comparing the readings to a pre-defined curve, and determining whether corrective action should be taken, may be distributed among the components 50, 51, etc. in any suitable manner.

Figure 9:
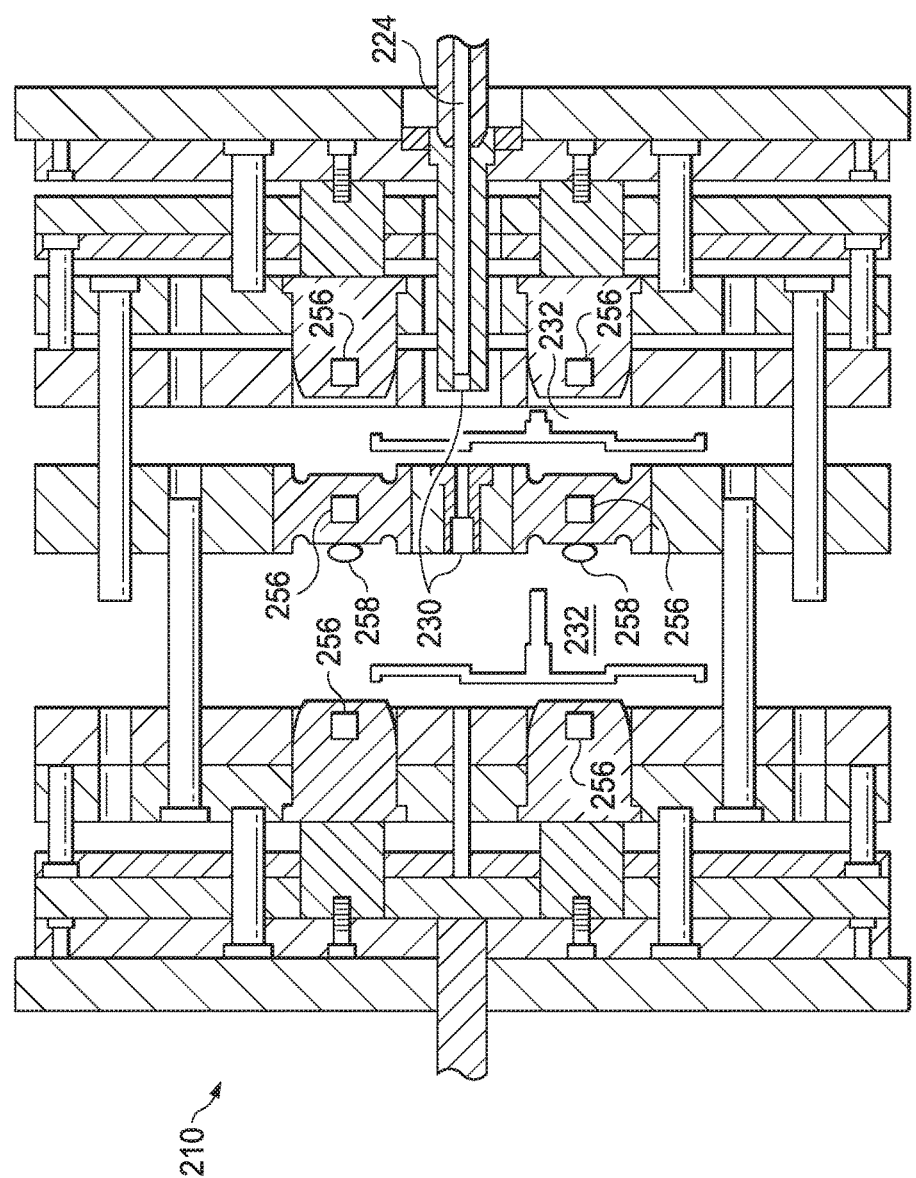
FIG. 9 illustrates a two layer stack injection molding apparatus utilizing strain gauge sensors in conjunction with multiple mold cavities.

FIG. 9 illustrates an alternative arrangement of injection molding apparatus 10 depicted in FIG. 1. In FIG. 6, the injection molding apparatus 210 is has a two layer stacked molding configuration. Multiple mold cavities 232 are present and may be stacked on one another. To accommodate the stacked configuration, molten thermoplastic material 224 flows through two gates 230 into the mold cavities 232. A plurality of strain sensors 256 may be utilized at or near the parting lines of the injection molding apparatus 10. A benefit of having a plurality of strain sensors 256 in the multiple mold cavities 232, as opposed to only having a single mold cavity 232 outfitted with a strain sensor, is that the virtual sensor 51 (pictured in FIG. 1) can determine the percentage fill of each of the mold cavities 232. This is important because in certain molding configurations, some mold cavities 232 may fill sooner or later than other mold cavities 232, such that the percentage fill of a single mold cavity 232 is not necessarily representative of the fill of all of the plurality of mold cavities 232. In addition, traditional cavity sensors 258 may be present in mold cavities 232. These traditional cavity sensors 258 may provide to the controller 50 (pictured in FIG. 1) information that may be used to activate certain changes to the injection molding process that are not controlled by the virtual cavity sensor 51. One benefit to having a plurality of strain gauge sensors 256 in an injection molding apparatus 210 in addition to traditional cavity sensors 258 is that traditional cavity sensors 258 do not provide any measurements for a given mold cavity 232 in the event that particular mold cavity 232 is not being filled with molten thermoplastic material 224 due to the mold cavity 232 being down for maintenance. However, the strain gauge sensors 256 located on that mold cavity 232 still provide strain change information that can be used to determine, for example, whether the down mold cavity 232 is experiencing a level of pressure that could result in damage to the mold cavity 232.

Figure 10:
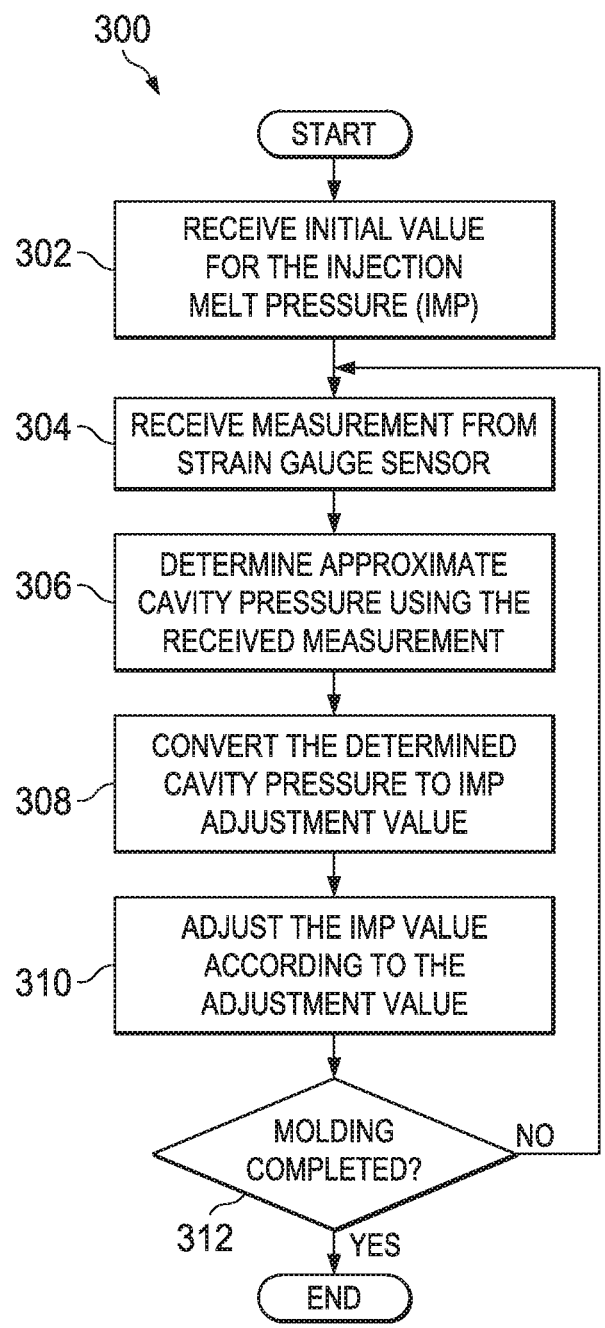
FIG. 10 illustrates a flow diagram of an example method for adjusting the internal melt pressure (IMP) using readings from a strain gauge sensor, which can be implemented in the controller of FIG. 1, for example.

FIG. 10 illustrates an example method 300 for adjusting an injection melt pressure (IMP) at which thermoplastic material is injected into the mold cavity 32 (see FIG. 1). The controller 50 can implement this method to dynamically adjust the signal supplied to the screw control 36 via the wired connection 56, for example.

The method 300 begins at block 302, where the initial value of the IMP is obtained. At block 304, a measurement from a strain gauge sensor (e.g., the strain gauge sensor 52) is obtained. In some embodiments, measurements from multiple strain gauge sensors are received at block 304. An approximate cavity pressure is determined using the measurement(s) from the one or more strain gauge sensors (block 306). The virtual cavity sensor 51, for example, can implement blocks 304 and 306.

Next, at block 308, an adjustment value for the IMP is determined using the approximate cavity pressure determined at block 306. To this end, the controller 50 and/or the virtual cavity sensor 51 can receive an indication of the appropriate mapping from an operator (e.g., "adjust the IMP by N units in response to each M-unit drop detected in the cavity"), from a pre-defined lookup table, according to a certain formula, or in any other suitable matter. At block 310, the adjustment value is applied as feedback to the current value of the IMP to execute a feedback loop control scheme.

If it is determined at block 314 that a certain predefined condition has been satisfied, such as the strain gauge measurement(s) providing data indicative of the melt flow-front having reached end-of-fill or another predetermined location within the mold cavity, the method 300 completes. Otherwise, the flow returns to block 304 to await a new reading from the strain gauge sensor. The timing of re-executing block 304 can be pre-configured or operator-controlled, for example. By way of example only, a new reading from the gauge sensor can be received continuously or nearly continuously, which, as those terms are used herein, include increments of every millisecond, every two milliseconds, every three milliseconds, every four milliseconds, every five milliseconds, or any other subdivision of time that may be required from initiation of fill to end-of-fill which is suitable for taking strain gauge measurements, comparing those measurements to data points consistent with predetermined or desired pressure-versus-time values, and adjusting IMP in an effort to counteract any discrepancies. The readings may be taken at equal or unequal increments of time, throughout fill or during particular intervals while filling the mold cavity.

Part, parts, or all of any of the embodiments disclosed herein can be combined with part, parts, or all of other injection molding embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" and published as US 2012-0294963, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus", now U.S. Pat. No. 8,757,999, which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus", now U.S. Pat. No. 8,911,228, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" and published as US 2012-0295050, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" and published as US 2012-0295049, which is hereby incorporated by reference.

Embodiments of the present disclosure can be used with embodiments for co-injection processes, as disclosed in U.S. patent application Ser. No. 13/774,692 filed Feb. 22, 2013, entitled "High Thermal Conductivity Co-Injection Molding System" and published as US 2013-0221572, which is hereby incorporated by reference.

Embodiments of the present disclosure can be used with embodiments for molding with simplified cooling systems, as disclosed in U.S. patent application Ser. No. 13/765,428 filed Feb. 12, 2013, entitled "Injection Mold Having a Simplified Evaporative Cooling System or a Simplified Cooling System with Exotic Cooling Fluids", now U.S. Pat. No. 8,591,219, which is hereby incorporated by reference.

Embodiments of the present disclosure can be used with embodiments for molding thinwall parts, as disclosed in U.S. patent application Ser. No. 13/601,514 filed Aug. 31, 2012, entitled "Method and Apparatus for Substantially Constant Pressure Injection Molding of Thinwall Parts", now U.S. Pat. No. 8,828,291, which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism" and published as US 2014-0127338, which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine" and published as US 2013-0221575, which is hereby incorporated by reference.

Embodiments of the present disclosure can be used with embodiments for molding certain thermoplastics, as disclosed in U.S. patent application Ser. No. 14/085,515 filed Nov. 20, 2013, entitled "Methods of Molding Compositions of Thermoplastic Polymer and Hydrogenated Castor Oil" and published as US 2014-0145374, which is hereby incorporated by reference.

Embodiments of the present disclosure can be used with embodiments for runner systems, as disclosed in U.S. patent application Ser. No. 14/085,515 filed Nov. 21, 2013, entitled "Reduced Size Runner for an Injection Mold System" and published as US 2014-0141117, which is hereby incorporated by reference.

Embodiments of the present disclosure can be used with embodiments for moving molding systems, as disclosed in U.S. patent application Ser. No. 14/275,944 filed May 13, 2014, entitled "Low Constant Pressure Injection Molding System with Variable Position Molding Cavities:" and published as US 2014-0335219, which is hereby incorporated by reference.

Embodiments of the present disclosure can be used with embodiments for injection mold control systems, as disclosed in U.S. patent application Ser. No. 14/176,505 filed Feb. 10, 2014, entitled "Injection Molding Machines and Methods for Accounting for Changes in Material Properties During Injection Molding Runs", now U.S. Pat. No. 8,980,146, which is hereby incorporated by reference.

Embodiments of the present disclosure can be used with embodiments for injection mold control systems, as disclosed in U.S. patent application Ser. No. 14/448,648 filed Jul. 31, 2014, entitled "Injection Molding Machines and Methods for Accounting for Changes in Material Properties During Injection Molding Runs" and published as US 2015-003518, which is hereby incorporated by reference.

Embodiments of the present disclosure can be used with embodiments for injection mold control systems, as disclosed in U.S. patent application Ser. No. 14/448,726 filed Jul. 31, 2014, entitled "Injection Molding Machines and Methods for Accounting for Changes in Material Properties During Injection Molding Runs" and published as US 2015-0115491, which is hereby incorporated by reference.

Embodiments of the present disclosure can be used with embodiments for using injection molding to form overmolded articles, as disclosed in U.S. patent application Ser. No. 14/577,310 filed Dec. 19, 2014, entitled "Methods of Forming Overmolded Articles" and published as US 2015-0174803, which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity", which is hereby incorporated by reference.

Embodiments of the present disclosure can be used with embodiments for controlling molding processes, as disclosed in U.S. Pat. No. 5,716,561 issued Feb. 10, 1998, entitled "Injection Control System", which is hereby incorporated by reference.

Embodiments of the present disclosure can be used with embodiments for molding preforms, as disclosed in U.S. patent application Ser. No. 61/952,281, entitled "Plastic Article Forming Apparatus and Methods for Using the Same", which is hereby incorporated by reference.

Embodiments of the present disclosure can be used with embodiments for molding preforms, as disclosed in U.S. patent application 61/952,283, entitled "Plastic Article Forming Apparatus and Methods for Using the Same", which is hereby incorporated by reference.

Embodiments of the present disclosure can be used with embodiments for brazed feed systems, as disclosed in U.S. patent application 62/032,071, entitled "Feed System for an Injection Molding Machine", which is hereby incorporated by reference.

Embodiments of the present disclosure can be used with embodiments for unbrazed feed systems, as disclosed in US patent application 62/042,577, entitled "Feed System for an Injection Molding Machine", which is hereby incorporated by reference.

Embodiments of the present disclosure can be used with embodiments of heated molds for injection molding machines, as disclosed in U.S. patent application 62/045,373, entitled "Injection Molding with Localized Heating in Flow Challenge Regions", which is hereby incorporated by reference.

Embodiments of the present disclosure can be used with embodiments for retrofitting injection molding machines, as disclosed in U.S. patent application 62/053,499, entitled "Retrofitted Injection Molding Machines", which is hereby incorporated by reference.

Embodiments of the present disclosure can be used with embodiments for continuous injection molding, as disclosed in U.S. patent application 62/084,778, entitled "System and Method for Continuous Injection Molding", which is hereby incorporated by reference.

Embodiments of the present disclosure can be used with embodiments for continuous co-injection molding, as disclosed in U.S. patent application 62/084,787, entitled "Co- Injection with Continuous Injection Molding", which is hereby incorporated by reference.

Embodiments of the present disclosure can be used with embodiments for injection molding with coining, as disclosed in U.S. patent application 62/186,722, entitled "Sequential Coining", which is hereby incorporated by reference.

Embodiments of the present disclosure can be used with embodiments for injection molding control, as disclosed in U.S. patent application 62/186,739, entitled "Method of Injection Molding with Constant-Velocity Flow Front Control", which is hereby incorporated by reference.

Embodiments of the present disclosure can be used with embodiments of injection molding under certain equipment conditions, as disclosed in U.S. patent application 62/192,616, entitled "Injection Molding with a Leaking Check Ring", which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of injection molding, comprising:
   measuring, using at least one strain gauge sensor, a change in strain in a mold side of a mold cavity;
   approximating, by a controller, at least one of a pressure or a melt flow front location within the mold cavity based on the change in strain;
   comparing, by the controller, the approximated pressure or melt flow front location to a trigger point;
   determining, by the controller, that the approximated pressure or melt flow front location equals or exceeds the trigger point; and
   activating, by the controller, a virtual cavity sensor,
   wherein upon activation, the virtual cavity sensor tracks approximated pressures calculated from the change in strain measurements measured by the at least one strain gauge sensor over time, and compares the results of the approximated pressure tracking to a pre-defined pressure-time curve, the pre-defined pressure-time curve being a parabolic curve that approaches an asymptote at a maximum pressure setting the mold cavity is set to achieve.

2. The method of claim 1, wherein upon activation, the virtual cavity sensor causes a controller to perform an action comprising at least one of increasing a rate of injection of molten thermoplastic material, decreasing the rate of injection of molten thermoplastic material, increasing the force of injection of molten thermoplastic material, decreasing the force of injection of molten thermoplastic material, actuating one or more walls of the mold cavity, or activating a heating element within the mold cavity.

3. The method of claim 1, further comprising:
   wherein, if the comparison of the results of the approximated pressure tracking to the pre-defined pressure-time curve indicates that the pre-defined pressure-time curve is not being followed, adjusting, by a controller, an injection molding process.

4. The method of claim 3, wherein adjusting, by a controller, an injection molding process comprises injecting additional molten thermoplastic material.

5. The method of claim 3, wherein adjusting, by a controller, an injection molding process comprises increasing a rate of injection of molten thermoplastic material.

6. The method of claim 3, wherein adjusting, by a controller, an injection molding process comprises decreasing the rate of-injection of molten thermoplastic material.

7. The method of claim 3, wherein adjusting, by a controller, an injection molding process comprises increasing the force of-injection of molten thermoplastic material.

8. The method of claim 3, wherein adjusting, by a controller, an injection molding process comprises decreasing the force of-injection of molten thermoplastic material.

9. The method of claim 1, wherein upon activation, the virtual cavity sensor determines the viscosity of molten thermoplastic material being injected into the mold cavity.

10. The method of claim 1, where upon activation, the virtual cavity sensor determines the percentage of the mold cavity that has been filled with molten thermoplastic material.

11. The method of claim 1, comprising:
    measuring, using at least one direct cavity sensor, a change in mold cavity pressure in the mold cavity.

12. The method of claim 1, comprising:
    measuring, using a plurality of strain gauge sensors, a change in strain in a plurality of mold sides of a plurality of mold cavities; and
    wherein upon activation, the virtual cavity sensor determines the percentage of mold cavity that has been filled with molten thermoplastic material for each of the plurality of mold cavities.

13. The method of claim 12, comprising:
    measuring, using at least one direct cavity sensor, a mold cavity pressure in each of the plurality of mold cavities.

14. The method of claim 13, comprising:
    ensuring through use of the at least one strain gauge sensor that none of the mold cavity pressures measured by the at least one direct cavity sensor exceed a maximum mold cavity pressure.

15. The method of claim 1, comprising:
    approximating, by a controller, a pressure at the melt flow front based on the change in strain.

16. The method of claim 1, wherein the trigger point occurs when the mold side is experiencing both an opening and a closing force.

17. The method of claim 1, wherein the pre-defined pressure-time curve is defined by the time for a mold cavity to fill to 75% and the maximum pressure setting.

\* \* \* \* \*